United States Patent

Mizoguchi

[15] 3,644,900

[45] Feb. 22, 1972

[54] DATA-PROCESSING DEVICE

[72] Inventor: Tetsuya Mizoguchi, Tokyo, Japan

[73] Assignee: Tokyo Shibaura Electric Co., Ltd., Kawasaki-shi, Japan

[22] Filed: Dec. 1, 1969

[21] Appl. No.: 881,141

[30] Foreign Application Priority Data

Nov. 30, 1968 Japan....................................43/87729

[52] U.S. Cl...........................................................340/172.5
[51] Int. Cl............................................................G06f 9/20
[58] Field of Search................................................340/172.5

[56] References Cited

UNITED STATES PATENTS

| | | | |
|---|---|---|---|
| 3,202,969 | 9/1966 | Dunwell et al. | 340/172.5 |
| 3,210,733 | 10/1965 | Terzian et al. | 340/172.5 |
| 3,275,991 | 9/1966 | Schneberger | 340/172.5 |
| 3,354,430 | 11/1967 | Zeitler, Jr. et al. | 340/172.5 |
| 3,408,630 | 10/1968 | Packard et al. | 340/172.5 |

*Primary Examiner*—Paul J. Henon
*Assistant Examiner*—Mark Edward Nusbaum
*Attorney*—Kemon, Palmer & Estabrook

[57] ABSTRACT

In a data-processing device controlled by a high-speed control arithmetic unit the average access time is decreased by preventing the entry into a receiving register of a memory word which has been found unnecessary during the memory access period. In case an advance command is being issued designating one sink code out of a plurality of sink codes assigned to a certain receiving register, when the necessity arises for controlling transfer to another register due to the detection of a branch, interruption, etc., then another sink code is designated, in place of the originally designated sink code, out of the remaining codes within said receiving register without awaiting the termination of the original information readout, and that addressed register to which the control is transferred is read out.

7 Claims, 5 Drawing Figures

INVENTOR.

Tetsuya Miyazaki

BY

Nemon, Kleiner & Estabrook

Attys

INVENTOR.
Toshiya Miyaguchi
BY
Hemenway, Clemens & Estabrook
Atty.

INVENTOR.

BY Tetsuya Mizoguchi

Kenyon, Palmer & Estabrook Attys

DATA-PROCESSING DEVICE

BACKGROUND OF THE INVENTION

As a result of recent rapid progress and development of techniques of applying a data-processing device, for example, a digital electronic computer, it is increasingly demanded that said device be of large capacity, capable of diverse functions and operable at high speed.

As a means for effecting the high-speed processing of data, there has heretofore been proposed a method of allowing a programmed main control system additionally to perform a lookahead operation.

The program control unit of a data-processing device comprises a memory control section, main arithmetic control section and programmed control section performing the original control operation including housekeeping, for example, address operation. According to the aforesaid lookahead system, the last-mentioned section is separated from the first two sections and is made additionally to conduct a lookahead operation. Namely, before a given programmed instruction is fully processed, for example, while said instruction is being operated, there take place in advance the steps of performing instruction code fetch, operation code decoding, operand fetch and housekeeping, for example, address operation, which are all involved in the regular cycle of processing the following instruction, thereby causing a number of instructions to be processed in an overlapping state. With a data-processing device adopting said lookahead system, therefore, the main memory unit, main control unit, main arithmetic unit and input/output unit involved in said device are functionally made independent of each other and concurrently operated under control of a lookahead unit. Each of the aforementioned units of the data-processing device processes a series of instructions in turn at the stage for which it is responsible, regardless of the stages at which said instructions are processed by the other units. In this case, one instruction should of course be processed in a proper sequence of time, that is, in the specified order of processing stages, and a series of instructions should also be processed in the order in which they are programmed. To this end, therefore, each of the aforementioned units is provided with buffering so as to balance its operating speed with that of the others.

Further to accelerate the data-processing speed of a data-processing device adopting the aforesaid lookahead system, there has recently been proposed a method of previously designating registers for receiving data such as instruction code and operand fetched in advance. With a data-processing device adopting this method, registers for receiving data, for example, an instruction buffer and operand buffer are designated by codes (hereinafter referred to as "sink codes"). Where data are fetched in advance, the sink code of a register where there are to be stored said data is supplied to said main memory unit as a tag information (information for specifying a register to which data read out in advance are to be conducted, this definition being applicable hereinafter), together with an advanced fetch command and address code showing that location within a main memory unit where there are stored data to be read out by said advanced fetch command. Said data are sent forth from the main memory unit with said sink code or tag information to be stored in a register designated by said tag information. Generation of such sink code and supply of data fetched in advance to a register specified by said tag information are all carried out under control of the aforesaid lookahead unit.

With such data-processing device, there are issued some advanced fetch commands successively in advance in order to process a plurality of instructions at the same time in an overlapping relation. In such case, after there are supplied to a memory unit advanced fetch commands for given instruction data, said data are sometimes found unnecessary to process any more, because other instruction which has to be processed ahead of the first-mentioned data are processed (According to a lookahead system, the processing of any instruction is carried out in a proper sequence of time under a predetermined program. However, some data of an instruction which are to be processed after other instruction are fetched ahead of the operating of said other instruction data, though the former should be operated after the latter.) and in consequence there is detected a program transfer command, for example, a command for branching, jumping or interruption. In such case, it is preferred from the standpoint of accelerating the processing of data that any further performance of said advanced fetch be stopped and preparation be immediately made for the processing of programmed instructions designated by a new command for changing the previously set program, for example, the aforementioned jump command. However, with the prior art data processing device as described above, the register designated by the tag information given forth together with the advanced fetch command is barred from use for other purposes before it receives data though they have already become unnecessary. If such use should be forcibly carried out, then it will often occur that, for example, before data under a new program stored in a register are not used, said register will be additionally stored with unnecessary data according to an old program, thus said new necessary data already stored in said register are extinguished. Accordingly, the time will be entirely a loss which is consumed after there is detected a program transfer command such as the aforesaid jump command until there are taken out unnecessary data for which there was issued an advanced fetch command ahead of said program transfer command under the old program before it was changed. This leads to increase in the average memory access time of a data-processing device eventually to obstruct the acceleration of a data-processing speed. For resolution of such difficulties, there is proposed a method whereby data of programmed instruction designated by a program transfer command are stored in a different register from that which is intended to store data which have become unnecessary due to the detection of said program transfer command. With such type of data-processing device, there is issued very frequently a program transfer command, for example, a jump command. For proper operation of this method, therefore, there are required a considerable number of registers, so that said method is not desirable from the standpoint of making the arrangement of a data-processing device simple and compact.

SUMMARY OF THE INVENTION

The present invention has been accomplished in view of the aforementioned circumstances, and is intended to provide a data-processing device free from the drawbacks encountered with the prior art wherein incorporation of a lookahead system in a programmed control system has contracted the average memory access time of said device and has accelerated its data-processing speed.

According to the present invention, when there is detected a program transfer command during the processing of a given program, data which were fetched in advance under said program ahead of the detection of a program transfer command, but have become unnecessary are prevented from being stored in registers, and the processing of a new program specified by said program transfer command is immediately started after detection of said command using registers which might otherwise store said unnecessary data, thereby attaining the aforementioned object without the necessity of making the arrangement of a data-processing device unduly bulky and complicated. Accordingly, the data-processing device of the present invention adopting a lookahead system comprises means for attaching a sink code designating a register to an advanced fetch command as its tag information, means for conducting data read out by said advanced fetch command to a register specified by said tag information and means for changing over said sink code designating said register to any of the other sink codes which are allotted thereto, and preventing the data to which the sink code before said changeover is attached as tag information from being stored in a register specified by said tag information, whereby, when it is formed that there is no need for the data which were read out by the already issued advanced fetch command, there can be immediately given forth a new advance fetch command specifying the same register by using said new sink code as tag information.

DESCRIPTION OF THE PREFERRED EMBODIMENTS

Figure 1:
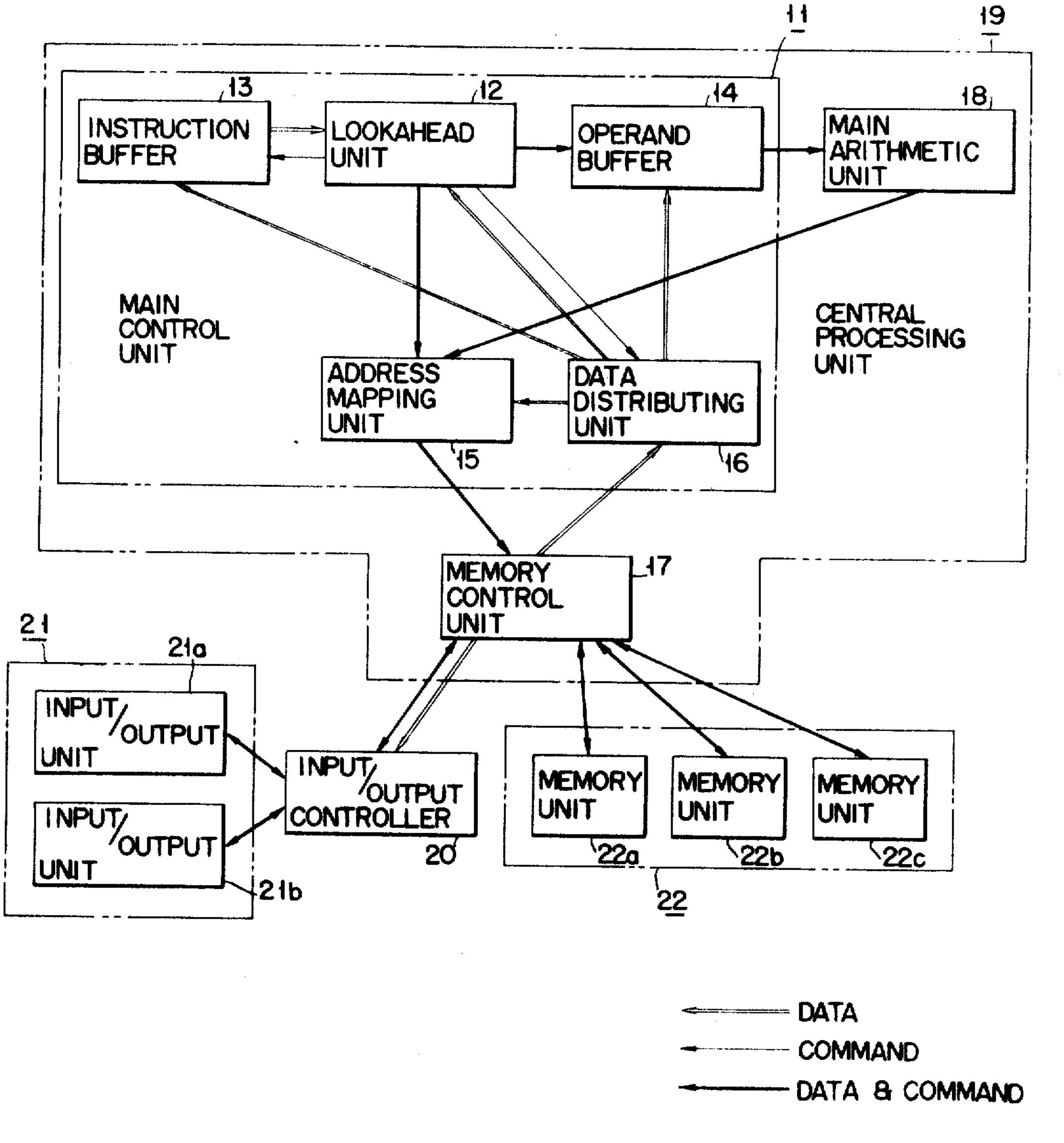
FIG. 1 shows a data-processing system used in a data-processing device according to an embodiment of the present invention.

There will now be described by reference to FIG. 1 a data-processing device according to an embodiment of the present invention comprising a main control unit, main arithmetic unit, main memory unit formed of a plurality of interleaved memory subunits and input/output unit. A lookahead unit 12, instruction buffer 13, operand buffer 14, address-mapping unit 15 and data-distributing unit 16 jointly constitute a main control unit 11. For convenience the individual units of the data-processing device are illustrated in FIG. 1 in block diagram form. For a more detailed illustration and description of the component parts of the individual blocks, reference may be made to the IBM Journal of Research and Development, Volume II, Number 1, Jan. 1967, wherein an instruction buffer and lookahead unit are described in the chapter entitled "The IBM System/360 Model 91; Machine Velocity and Instruction Handling" by D. W. Anderson, F. J. Sparacis, R. M. Tomasulo, at pp. 8–24. With regard to the "Operand Buffer" and an "Execution Unit," reference may be made to pages 25 to 33, inclusive, and 34 to 53, inclusive, said sections being entitled, respectively, "An Efficient Algorithm for Exploiting Multiple Arithmetic Units" by R. M. Tomasulo and "The IBM System/360 Model 91; Floating Point Execution Unit" by S. F. Anderson, J. F. Earle, R. E. Goldschmidt, D. M. Powers. With regard to the "Data Distributor Unit" and "-Memory Unit" reference may be made to pages 54 to 68 of the IBM article and the chapter entitled "The IBM System/360 Model 91; Storage System" by L. J. Boland; G. D. Granito, A. U. Morcotte, B. U. Messina and J. W. Smith, pages 54 to 68. Said lookahead unit 12 promotes advanced control by controlling the various units involved in a data-processing device. A lookahead unit 12 (hereinafter referred to as "LAU") conducts under a given program an advanced fetch command for an instruction code through an address-mapping unit 15 (hereinafter referred to as "AMU") to a memory control unit 17 (hereinafter referred to as "MCU") in order to allow said instruction code to be fetched in advance and stored in an instruction buffer 13 (hereinafter referred to as "IB"). Said LAU 12 modifies the address involved in the instruction code stored in advance in said IB 13 in accordance with an operation code involved in said instruction code and decoded by said IB 13 and supplies an advanced fetch command for an operand to MCU 17 in the same manner as that for the instruction code, and also an operation code to said operand buffer 14 (hereinafter referred to as "OB"). Further, LAU 12 allows a prescribed sink code to be generated by a sink code generator included therein, and attached as tag information, together with the address code of the main memory unit, to the aforesaid advanced fetch command for the data (a general term for said instruction code, data for address modification and operand, applicable hereinafter). Also LAU 12 sends signals to registers for receiving the data fetched in advance by said advanced fetch command for displaying a read flag showing that there is issued said advanced fetch command with the sink codes of said registers used as tag information. Upon indication of said read flag, all said registers are connected to a bus common to all said data, thus making preparation for reception of said data. In addition, LAU 12 performs various control operations resulting from the transfer of a program due to the detection of a command for jumping, branching or interruption.

IB 13 stores instruction codes fetched in advance by an advanced fetch command from LAU 12 and decodes the operation code of an instruction code expected to be processed next time. OB 14 stores operation codes from LAU 12 and operands fetched in advance by an advanced fetch command therefrom until the sequential order arrives in which they are to be processed by said main arithmetic unit 18 (hereinafter referred to as "MAU"). Said MAU 18 includes an operation control unit as used in a narrow sense, and performs under control of LAU 12 a prescribed operation in accordance with the operation code stored in OB 14. The aforementioned address-mapping unit 15 converts a physical address (or absolute address) to a logical address which was brought with an advanced fetch command or write-in command of data sent from LAU 12 or MAU 18. The aforesaid MCU 17 temporarily stores the above-mentioned command from LAU 12 or MAU 18 and a command sent from input/output units 21*a* and 21*b* through an input/output controller 20 (hereinafter referred to as "I/OC"), and supplies a readout or write-in command to memory unit 22 (hereinafter referred to as "MU") in accordance with the priority with which the first-mentioned commands are to be processed, and also conducts data drawn out of each of said memory unit 22 to the data-distributing unit 16 (hereinafter referred to as "DDU").

Data which were drawn out in advance from MU 22 by an advanced fetch command sent from LAU 12 in the aforementioned manner are transmitted to DDU 16 through MCU 17. Said data are forwarded by DDU 16 to the registers designated by the aforementioned tag information or sink code which are disposed in LAU 12, IB 13, OB 14 and, if required, in AMU 15, so as to be stored therein. At this time, the read flag is extinguished to indicate that the advanced fetch of data has been completed, and said registers are electrically disconnected from the aforesaid bus used in common to all data.

With the data-processing device of the present invention, there are allotted a plurality of sink codes to each of the registers included in the respective units of said device. Each register is provided with a plurality of read flags corresponding to the sink codes allotted thereto and also a means for changing the sink codes which are used in designating said register. When a program is changed due to the detection of a program transfer command, for example, a jump command while some programmed instructions being processed under the aforesaid advanced control system, then the sink code generator included in LAU 12 gives forth any one of those of a group of sink codes which were previously allotted to, but have not yet been used in newly designating the registers which store data fetched in advance under the old program ahead of the detection of said program transfer command. The sink code thus generated is attached as tag information to a prescribed advanced fetch command issued under a new program. At this time, LAU 12 sends forth a command to DDU, thereby preventing the aforesaid unnecessary data (which can be distinguished by the tag information thereof) from being stored in a register previously designated by said tag information, even when said data are fetched to DDU 16 in advance.

Figure 2:
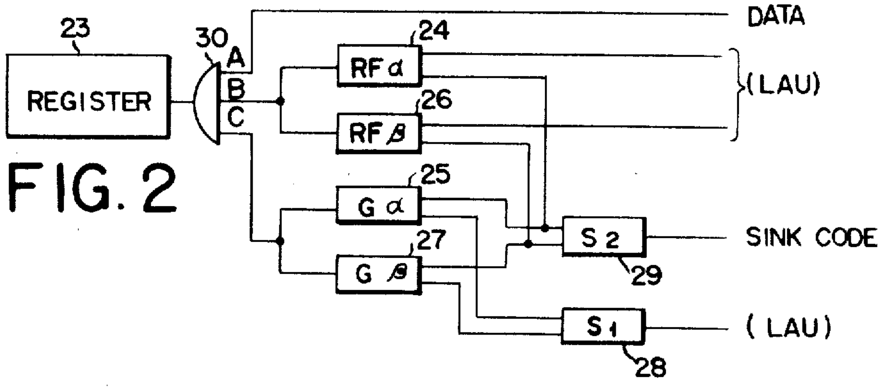
FIG. 2 is a block diagram showing one form of a data storage control means included in said data-processing device.

There will now be described by reference to FIG. 2 data storage control system or a system for preventing unnecessary data from being stored in a register. Let it be assumed that LAU 12 generates an advanced fetch command, for example, using as tag information one or $\alpha$ of the two sink codes $\alpha$ and $\beta$ allotted to a register 23. The LAU 12 immediately supplies a signal to a read flag 24 corresponding to said sink code $\alpha$ (hereinafter referred to as "RF$\alpha$") to bring it to a conducted state. At this time there is also supplied a sink code changeover signal to a gate circuit 25 corresponding to said sink code $\alpha$ (hereinafter referred to as "G$\alpha$") through, for example, a changeover circuit $S_1$ 28 to turn on said G$\alpha$ 25. Where, under such condition, there are supplied from MCU 18 data whose tag information is represented by sink code $\alpha$, said sink code $\alpha$ is forwarded to RE$\alpha$ 24 and G$\alpha$25 through another changeover circuit $S_2$ 29 to supply a signal to the input terminals B and C of an AND-circuit 30. Accordingly, the data brought to the other terminal A of said AND-circuit 30 are stored in a corresponding register as they are. At this time RF$\alpha$24 disappears due to the passage of said sink code $\alpha$, showing that the advanced fetch of data whose tag information is represented by said sink code $\alpha$ has been completed. On the other hand, where, after issue of an advanced fetch command whose tag information is denoted by said sink code $\alpha$, there is detected a program transfer command and LAU 12 gives forth a new advanced fetch command for which sink code $\beta$ is used as tag information, then LAU 12 supplies a signal to a read flag RF$\beta$ corresponding to said sink code $\beta$ to turn it on, and also to the aforesaid changeover circuit $S_1$ 28 to deenergize the gate circuit G$\alpha$25 corresponding to the sink code $\alpha$ to turn it off, and instead to energize a gate circuit G$\beta$27 corresponding to said sink code $\beta$ to turn it on. Once such condition is attained, there is not supplied any signal to the input terminal C of said AND-circuit 30 because said G$\alpha$ 25 is in the OFF state, even if there is brought from MCU 17 the data using sink code $\alpha$ as its tag information, so that said data are completely prevented from being restored in a register through said AND-circuit 30. However, since RF$\alpha$24 is supplied with a signal of sink code $\alpha$, it disappears, showing that the advanced fetch of data using sink code $\alpha$ as its tag information has been brought to an end. On the other hand, where, under the aforementioned circuit condition, there are supplied from MCU 17 data fetched in advance bearing said sink code $\beta$ as its tag information, then both RF$\beta$26 and G$\beta$27 are turned on, so that both input terminals B and C of said AND-circuit 30 are supplied with signals. Accordingly, said data using sink code $\beta$ as its tag information passes through the AND-circuit 30 to be stored in a register. At this time, RF$\beta$26 disappears due to the passage of said sink code $\beta$, indicating that the advanced fetch of data whose tag information is represented by sink code $\beta$ has been ended. The foregoing description relates to the case where there was detected a program transfer command after there was issued an advanced fetch command with sink code $\alpha$ used as tag information and there was further given forth a new advanced fetch command using sink code $\beta$ as tag information. However, the present invention is also applicable to the reverse case.

Figure 3:
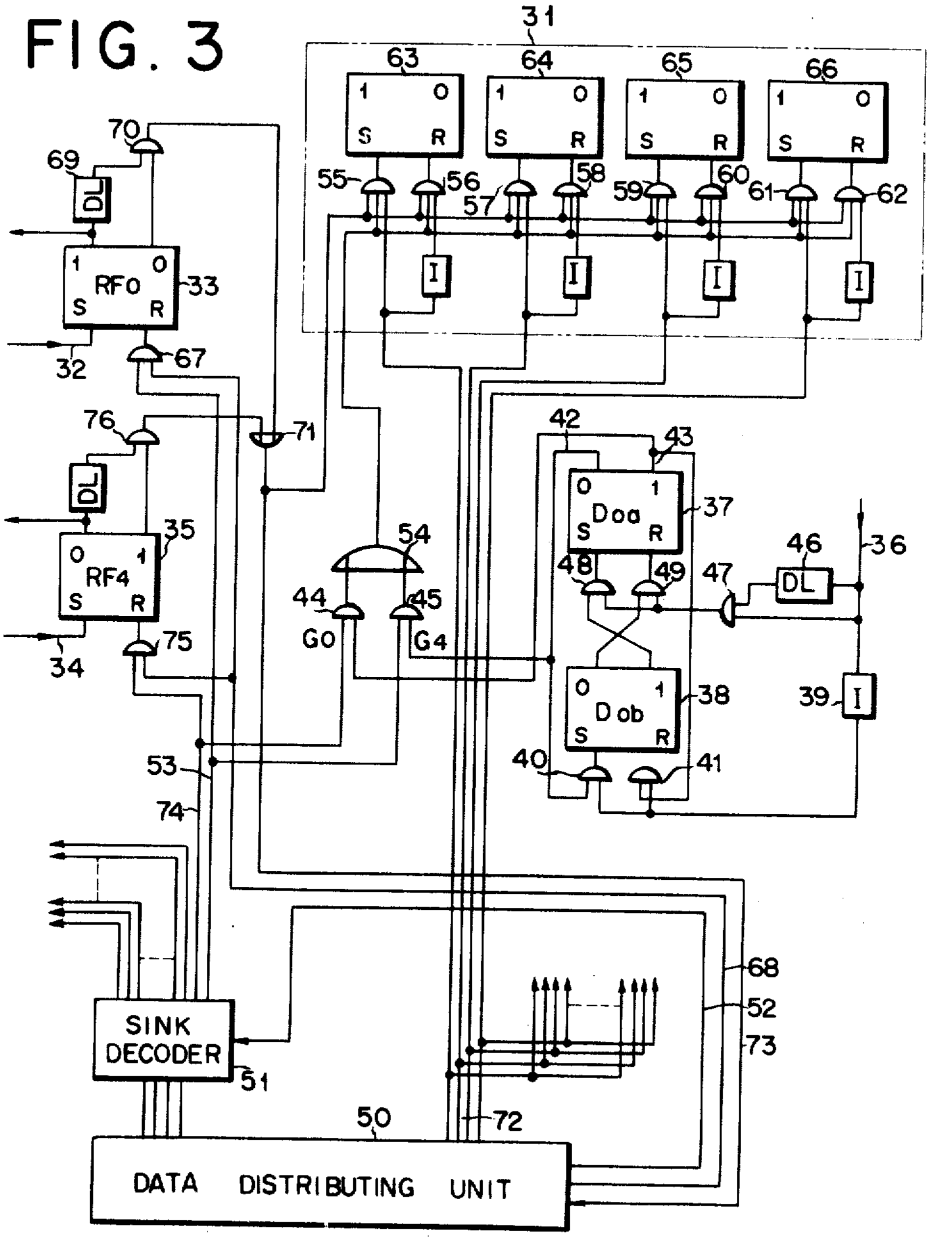
FIG. 3 is a circuit diagram of said data storage control means shown in FIG. 2.

There will now be described the present invention in greater detail by reference to FIG. 3 illustrating a circuit disposed around one of the registers included in the instruction buffer IB 13 of a data-processing device according to an embodiment thereof.

Now let it be assumed that said IB 13 comprises, for example, four registers, to each of which there are allotted two sink codes. These sink codes are defined, for example, as shown in Table 1 below.

TABLE 1

| Register | Sink Code $\alpha$ | Sink Code $\beta$ |
|---|---|---|
| 0 | 0 (0000) | 4 (0100) |
| 1 | 1 (0001) | 5 (0101) |
| 2 | 2 (0010) | 6 (0110) |
| 3 | 3 (0011) | 7 (111) |

For example, where LAU 12 (see FIG. 1) supplies an advanced fetch command to MU 22 as described above to allow an instruction code to be fetched in advance using the sink code (0000) of the register (0) 31 of IB 13 (FIG. 1), then LAU 12 immediately energizes a signal line 32 to set a flip-flop circuit $RF_0$33. This flip-flop circuit $RF_0$ corresponds to the read flag RF$\alpha$ of FIG. 2. Since, in this case, there is issued an advanced fetch command using the sink code (0000) as tag information, the read flag RF$\beta$ need not be displayed, so that the signal line 34 of a flip-flop circuit $RF_4$ 35 is not energized to bring said circuit $RF_4$ 35 to a reset state. In this case, a flip-flop circuit $D_{0a}$ 37 is previously so set as to be kept in a reset state. Since the signal line 36 of said flip-flop circuit $D_{0a}$ 37 is not supplied with signals from LAU 12, there is obtained a signal at the output side of a NOT-circuit 39, said signal being conducted to AND-circuits 40 and 41. At this time, the AND-circuit 41 is also supplied with outputs from the output line 43 of said flip-flop circuit $D_{0a}$ 37, so that a flip-flop circuit $D_{0b}$ 38 is also kept in a reset state. These flip-flop circuits $D_{0a}$ and $D_{0b}$ correspond to the changeover circuit $S_1$ 28 of FIG. 2. On the other hand, since the flip-flop circuit $D_{0a}$ 37 is reset, there is supplied a gate signal only to the AND-circuit $G_0$ 44 involved in the AND-circuits $G_0$ 44 and $G_4$ 45 associated with the gate circuits G$\alpha$ and G$\beta$ respectively.

If there appears, for example, a jump command under the aforementioned condition, namely, when there is issued an advanced fetch command with the sink code (0000) used as tag information, then LAU 12 must start a preliminary operation to process a program designated by said jump command. To this end, the instruction code which is stored in the address of a memory unit designated by said jump command must be drawn out from MU 22 (FIG. 1) to said register (0).

In this case, with the prior art, even when it is recognized that the instruction code read out by an advanced fetch command issued ahead of the appearance of said jump command has already become unnecessary, if it is found that the read flag of a corresponding register has not been extinguished, namely, that the flip-flop circuit $RF_0$ still remains set, it is impossible to use said register or to issue a command using the sink code of said register as tag information in order to fetch in advance the instruction code stored in the address of a memory unit designated by said jump command.

However, with a data-processing device according to the foregoing embodiment of the present invention, an advanced fetch command can be given forth for the aforementioned instruction code immediately upon the appearance of said jump command with the same register designated for reception of said instruction code. Namely, where the transfer of a program is determined by the appearance of said jump command, LAU 12 immediately supplies the signal line 36 with a signal for changing over the sink code. When the signal line 36 is energized, there is generated a pulse having a suitable width on the output side of an AND-circuit 47 due to the action of a delay element 46. Since, at this time, the flip-flop circuit $D_{0b}$ 38 is already reset, the output line of an AND-circuit 48 is energized to set the flip-flop circuit $D_{0a}$ 37. After lapse of a certain length of time, said signal line 36 is deenergized and the output line of the NOT-circuit 39 is energized. Since, at this time, the output line 42 of the flip-flop circuit $D_{0a}$ 37 is energized, the output line of the AND-circuit 40 is also energized to set the flip-flop circuit $D_{0b}$ 38. When the flip-flop circuit $D_{0a}$ 37 is set as above described, the supply of a gate signal to the AND-circuit $G_0$ 44 which has been continued up to this point is stopped, and instead the AND-circuit $G_4$ 45 is supplied with a gate signal.

When it is confirmed that the flip-flop circuit $RF_4$ 35 is reset after the aforesaid changeover of the sink code, LAU 12 supplies MCU 17 through MU 22 with an advanced fetch command using the other sink code (0100) allotted to the register (0) 31 as tag information and also sends a signal to the set terminal 34 of the flip-flop circuit $RF_4$ 35 to set it. If, in this case, the signal from the output line 42 of the flip-flop circuit $D_{0a}$ 37 is brought to LAU 12 so as to form the third bit (weight 4) of the aforesaid sink code represented by a binary number, then the supply of a sink code changeover signal to the signal line 36 will automatically allow the tag information of the advanced fetch command to be changed over, for example, from (0000) to (0100). If the flip-flop circuit $RF_4$ 35 is found to be in a set state, LAU 12 will be brought to a locked state, and temporarily prevented from issuing an advanced fetch command. However, the moment said flip-flop circuit $RF_4$ is reset, LAU 12 will give forth said advanced fetch command whose tag information is denoted by the sink code (0100).

There will now be described three cases of time sequence in which there are read out under the aforementioned conditions the instruction code (0) which has become unnecessary and a new instruction code (4) designated by said jump command.

I. Where the unnecessary instruction code (0) is read out ahead of the changeover of the sink code, namely, before the flip-flop circuit $D_{0a}$ 37 is set.

The sink code (0000) supplied from MCU 17 through DDU 50 together with said instruction code (0) is forwarded to a sink decoder 51. When supplied at this time with an energizing signal from DDU 50 through a signal line 52, said sink decoder 51 decodes said sink code (0000), and sends a sink signal (0) to its output line 53 corresponding to said sink code (0000). Since, at this time, the AND-circuit $G_0$ 44 is already supplied with a gate signal, said sink signal (0) passes through said AND CIRCUIT $G_0$ and then through an OR-circuit 54 to the input side of the AND-circuits 55 to 62 adopted to, for example, four flip-flop circuits 63 to 66 forming aforesaid register (0). The sink signal (0) is also sent to the AND-circuit 67. Since, at this time, a signal line 68 is already supplied with a signal showing the completion of a readout operation, the output line of said AND-circuit 67 is energized to reset the flip-flop circuit $RF_0$ 33 and extinguish a corresponding read flag. When said flip-flop circuit $RF_0$ 33 is reset, there is generated a signal at the output line of an AND-circuit 70 due to the action of a delay element 69. Said signal is brought to the input side of the aforesaid AND-circuits 55 to 62 through an OR-circuit 71. Therefore the instruction code (0) supplied to the data-receiving register (0) through a common data bus 72 is conducted to said flip-flop circuits 63 to 66 through said AND-circuits 55 to 62. Thus the instruction code (0) is stored in a register designated by its tag information. The output signal from said OR-circuit 71 is also sent to DDU 50 through a signal line 73. In DDU 50 said signal is treated as a return signal of said signal showing the completion of a readout operation. After the instruction code (0) bearing the sink code (0000) as its tag information is stored in the register (0) 31, the sink code is changed over. Accordingly, when a new instruction code (4) using the sink code (0100) as its tag information is brought to the register (0) 31, the instruction code (0) previously stored therein is extinguished, and said new instruction code (4) is stored in the same manner as described in the following case (II).

II. Where the readout of said unnecessary instruction code (0) is finished after the changeover of the sink code and before there is read out a new instruction code (4) stored in the address designated by the jump command.

In this case, even though the output line 53 of the sink decoder 51 may be energized by the sink signal (0) as described in item I above, the AND-circuit $G_0$44 is not supplied with a gate signal, so that there is not supplied with a signal on the output side of said circuit $G_0$44. Accordingly, the instruction code brought to the register (0) 31 through the common data bus 72 is prevented from passing through the AND-circuits 55 to 62 and in consequence from being stored in the register (0). Since, however, both the output line 53 of the sink decoder 51 and the aforesaid signal line 68 are energized, the flip-flop circuit $RF_0$33 is reset as in item I and a return signal of the signal showing the completion of a readout operation is set to DDU 50. When, after this, the aforementioned new necessary instruction code (4) is read out, the sink code (0100) is decoded by the sink decoder 51 as in the previous case, forwarding a sink signal (4) to the prescribed output line 74 of said decoder 51. At this time, the AND-circuit $G_4$45 is supplied with a gate signal as described above, so that said sink signal (4) is conducted to the input side of the AND-circuits 55 to 62 of the register (0) 31 through the AND CIRCUIT $G_4$ and then OR-circuit 54. At this time, the signal showing the completion of a readout operation is sent to the signal line 68 and said sink signal (4) are brought to the input side of an AND-circuit 75 to energize its output line, thereby resetting the flip-flop circuit $RF_4$ 35 and extinguishing a read flag corresponding to said sink code (0100). As a result of the resetting of said flip-flop circuit $RF_4$35, there is generated a signal on the output side of an AND-circuit 76, said signal being forwarded to the input side of said AND-circuits 55 and 62 through said OR-circuit 71. Accordingly, the instruction code (4) brought to the register (0) through said common data bus 72 is allowed to be passed through said AND-circuits 55 to 62 and stored in the register (0) 31. And the output signal from the AND-circuit 75 is also sent to DDU 50 as a return signal of the signal showing the completion of a readout operation.

III. Where the unnecessary instruction code (0) is read out after there is read out the instruction code (4) stored in the address designated by said jump command.

Said instruction code (4) is stored in the register (0) 31 in the same manner as in item II above. In this case, as in item II above, the AND-circuit $G_0$44 is not supplied with a gate signal and consequently the sink signal (0) can not pass therethrough. Accordingly, the sink code (0000) is prevented from passing through said AND-circuits 55 to 62 and in consequence from being stored in the register (0), so that there is no possibility of the instruction code (4) already stored in the register (0) being changed into the unnecessary instruction code (0).

The foregoing description relates to one of the registers included in the instruction buffer. However, the same data storage control means is also applicable to the registers disposed, for example, in an operand buffer and lookahead unit. If there are allotted different sink codes to all the registers and these registers are connected to the common data bus and the sink code decoder is furnished with an ability to decode all said different sink codes, then DDU 50 will be essentially required to have any function, but only to allow various signals to pass therethrough.

Figure 4:
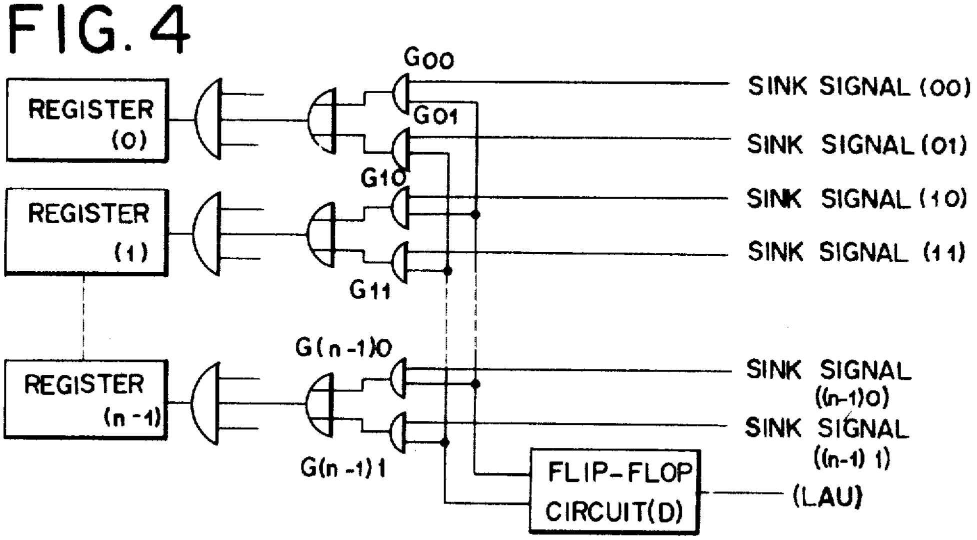
FIGS. 4 and 5 illustrate the main parts of data storage control means modified from the aforementioned embodiment.
Figure 5:
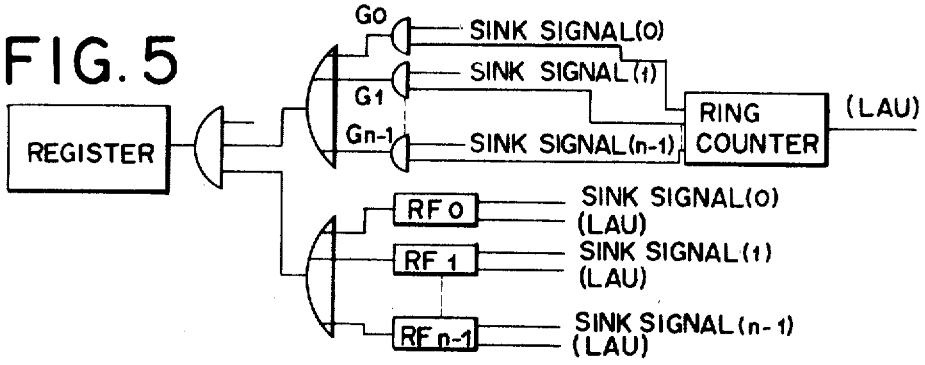

According to the foregoing embodiment, each of the registers is provided with one sink code changeover circuit. However, as shown in FIG. 4, it is possible to group a plurality of registers, for example, all those included in the instruction buffer or entire data-processing device, provide a single sink code changeover circuit for such group so as to change over all the sink codes involved therein at the same time. Further, according to the foregoing embodiment, there are allotted two different sink codes to one register. However, as shown in FIG. 5, a sink code changeover circuit may be made into a multistep type using, for example, a ring counter so as to allot more than two sink codes to one register.

What is claimed is:

1. A data-processing device capable of preventing entry into a receiving register of a memory word found unnecessary during a memory access period comprising memory means storing data in different addresses therein;

data-receiving means including a plurality of registers for receiving data;

lookahead unit means for providing address and tag information for designating one of said registers as the register to which data is to be transferred from said memory means;

transfer control means responsive to said address information supplied by said lookahead unit means for controlling the transfer of data read out of said memory means by said address information to the designated register of said data-receiving means identified by said tag information, and tag information modifying means for changing said tag information logically to designate another of said registers of the data-receiving means and to clear said previously designated register of the data-receiving means for another purpose when the memory word has been found unnecessary.

2. A data-processing device according to claim 1 wherein said tag information modifying means comprises first flip-flop means for designating whether the tag information should be cancelled or not, and second flip-flop means for designating whether the data-receiving means is already selected by said tag or not.

3. A data-processing device according to claim 2 wherein said data-receiving means comprises a first receiving register controlled only by said first flip-flop means.

4. A data-processing device according to claim 2 wherein the plurality of registers are each controlled only by the first flip-flop means.

5. A data-processing device according to claim 2 wherein said data-receiving means comprises a plurality of receiving registers and said second flip-flop means are equal in number to said registers.

6. A data-processing device according to claim 5 wherein said second flip-flop means are a pair of flip-flops set in accordance with the tag information previously provided and arranged to be logically changed when said tag information is cancelled.

7. A data-processing device according to claim 5 wherein said second flip-flop means are a plurality of flip-flops each of which are selected by a distinct tag information.

* * * * *